(12) United States Patent
Allen

(10) Patent No.: US 10,817,601 B2
(45) Date of Patent: *Oct. 27, 2020

(54) HYPERVISOR ENFORCEMENT OF CRYPTOGRAPHIC POLICY

(71) Applicant: Amazon Technologies, Inc., Seattle, WA (US)

(72) Inventor: Nicholas Alexander Allen, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/876,020

(22) Filed: Jan. 19, 2018

(65) Prior Publication Data

US 2018/0157828 A1 Jun. 7, 2018

Related U.S. Application Data

(63) Continuation of application No. 14/852,361, filed on Sep. 11, 2015, now Pat. No. 9,892,254, which is a continuation of application No. 14/223,868, filed on Mar. 24, 2014, now Pat. No. 9,135,437.

(51) Int. Cl.
*G06F 11/30* (2006.01)
*G06F 21/53* (2013.01)
*G06F 9/455* (2018.01)

(52) U.S. Cl.
CPC .......... *G06F 21/53* (2013.01); *G06F 9/45558* (2013.01); *G06F 2009/45587* (2013.01); *G06F 2221/034* (2013.01)

(58) Field of Classification Search
CPC ...... G06F 21/53; G06F 21/552; G06F 21/554; G06F 9/45558; G06F 2009/45587; G06F 2221/034
USPC .......................................... 726/22, 25, 23, 24
See application file for complete search history.

(56) References Cited

U.S. PATENT DOCUMENTS

| 8,578,076 | B2 | 11/2013 | van der Linden et al. |
| 8,881,282 | B1 * | 11/2014 | Aziz ..................... G06F 21/554 726/24 |
| 8,935,506 | B1 | 1/2015 | Gopalan |
| 9,135,437 | B1 * | 9/2015 | Allen ..................... G06F 21/53 |

(Continued)

OTHER PUBLICATIONS

Mehuron et al., "Security Requirements for Cryptographic Modules," U.S. Department of Commerce National Institute of Standards and Technology (NIST) Federal Information Processing Standards (FIPS) Publication 140-2, May 25, 2001, 69 pages.

*Primary Examiner* — Thu Ha T Nguyen
(74) *Attorney, Agent, or Firm* — Davis Wright Tremaine LLP

(57) ABSTRACT

Techniques for restricting the execution of algorithms contained in applications executing on virtual machines executing within a computer system are described herein. A first sampled set of computer executable instructions is gathered from a virtual machine by a controlling domain and compared against a reference set of computer executable instructions. If the first set is similar to the reference set, and if the execution of the algorithm corresponding to the reference set is restricted by one or more computer system polices, one or more operations limiting the execution of the restricted algorithm are performed, thus ensuring conformance with the computer system policies.

20 Claims, 10 Drawing Sheets

(56) References Cited

U.S. PATENT DOCUMENTS

| | | | |
|---|---|---|---|
| 9,176,843 B1* | 11/2015 | Ismael | G06F 11/362 |
| 9,900,330 B1* | 2/2018 | Dargude | H04L 63/1425 |
| 9,934,376 B1* | 4/2018 | Ismael | G06F 21/566 |
| 10,216,927 B1* | 2/2019 | Steinberg | G06F 9/45558 |
| 10,642,753 B1* | 5/2020 | Steinberg | G06F 21/56 |
| 10,664,535 B1* | 5/2020 | Hahn | G06F 16/9535 |
| 2008/0244569 A1 | 10/2008 | Challener et al. | |
| 2010/0269109 A1 | 10/2010 | Cartales | |
| 2011/0022812 A1 | 1/2011 | van der Linden et al. | |
| 2011/0296407 A1 | 12/2011 | Bhandari et al. | |
| 2012/0054744 A1 | 3/2012 | Singh et al. | |
| 2012/0096458 A1* | 4/2012 | Huang | G06F 9/5077 718/1 |
| 2012/0159454 A1 | 6/2012 | Barham et al. | |
| 2012/0167094 A1* | 6/2012 | Suit | G06F 9/5077 718/100 |
| 2012/0201169 A1 | 8/2012 | Subramanian et al. | |
| 2012/0311341 A1 | 12/2012 | Paris et al. | |
| 2013/0111468 A1 | 5/2013 | Davis et al. | |
| 2013/0159910 A1 | 6/2013 | Bostic et al. | |
| 2014/0068137 A1 | 3/2014 | Kegel et al. | |
| 2014/0075502 A1 | 3/2014 | Aissi et al. | |
| 2014/0215226 A1 | 7/2014 | Litty et al. | |
| 2014/0230077 A1 | 8/2014 | Muff et al. | |
| 2014/0351437 A1* | 11/2014 | Madani | H04L 47/70 709/226 |
| 2015/0052614 A1* | 2/2015 | Crowell | G06F 21/53 726/25 |
| 2015/0169345 A1 | 6/2015 | DeCusatis et al. | |
| 2015/0199531 A1* | 7/2015 | Ismael | G06F 21/552 726/30 |
| 2015/0324216 A1 | 11/2015 | Sizemore et al. | |
| 2016/0019464 A1* | 1/2016 | Madhavan | G06F 16/972 706/11 |
| 2016/0057619 A1* | 2/2016 | Lopez | G06F 9/455 380/247 |
| 2016/0070633 A1* | 3/2016 | Abraham | G06F 11/34 714/47.3 |
| 2016/0077981 A1 | 3/2016 | Kegel | |
| 2016/0147549 A1 | 5/2016 | Sivak et al. | |
| 2016/0182319 A1 | 6/2016 | Martin et al. | |
| 2016/0306965 A1* | 10/2016 | Iyer | G06F 21/552 |
| 2016/0328561 A1* | 11/2016 | Tamir | G06F 21/566 |
| 2016/0359915 A1* | 12/2016 | Gupta | H04L 63/20 |
| 2016/0359917 A1* | 12/2016 | Rao | H04L 63/1425 |
| 2016/0370843 A1* | 12/2016 | Gatson | G06F 1/3234 |
| 2017/0024234 A1* | 1/2017 | Wu | G06F 9/45558 |
| 2017/0060918 A1* | 3/2017 | Iyer | G06F 16/185 |
| 2017/0083354 A1* | 3/2017 | Thomas | H04L 67/24 |
| 2017/0115889 A1 | 4/2017 | Chen | |
| 2017/0180416 A1 | 6/2017 | Giura et al. | |
| 2017/0185437 A1* | 6/2017 | Thomas | G06F 9/45558 |
| 2017/0251013 A1* | 8/2017 | Kirti | H04L 63/1441 |
| 2017/0302505 A1* | 10/2017 | Zafer | H04L 41/0631 |
| 2017/0302553 A1* | 10/2017 | Zafer | H04L 41/142 |
| 2017/0302554 A1* | 10/2017 | Chandrasekaran | H04L 43/0882 |
| 2018/0191766 A1* | 7/2018 | Holeman | H04L 63/1433 |
| 2018/0306609 A1* | 10/2018 | Agarwal | H04L 67/12 |
| 2019/0036940 A1* | 1/2019 | Balakrishnan | H04L 63/08 |
| 2019/0095320 A1* | 3/2019 | Biswas | G06F 11/3457 |
| 2019/0108340 A1* | 4/2019 | Bedhapudi | G06F 16/1734 |
| 2019/0108341 A1* | 4/2019 | Bedhapudi | G06F 16/1752 |
| 2019/0311129 A1* | 10/2019 | Clifton | G06F 21/52 |
| 2020/0042426 A1* | 2/2020 | Ambichl | G06F 11/079 |

* cited by examiner

HYPERVISOR ENFORCEMENT OF CRYPTOGRAPHIC POLICY

CROSS REFERENCE TO RELATED APPLICATIONS

This application is a continuation of U.S. patent application Ser. No. 14/852,361, filed Sep. 11, 2015, entitled "HYPERVISOR ENFORCEMENT OF CRYPTOGRAPHIC POLICY," which is a continuation of U.S. patent application Ser. No. 14/223,868, filed on Mar. 24, 2014, now U.S. Pat. No. 9,135,437, entitled "HYPERVISOR ENFORCEMENT OF CRYPTOGRAPHIC POLICY," the disclosures of which are incorporated by reference herein in their entirety.

BACKGROUND

Modern computing systems place high importance on system security, and also place high importance on conformance with system policies. In many computer systems, particularly distributed computer systems, and especially those involving virtualized computing environments where a plurality of guest virtual machines may be hosted on shared physical host machines, both system security and policy conformance may become a concern. The distributed systems in which the guest virtual machines are implemented are often highly complex, comprising large numbers of networked host machines and a correspondingly large number of guest virtual machines. Such computer systems often operate with a large variety of operating systems and applications, and these operating systems and applications are often required to conform to a variety of system security policies. Frequently, implementations of cryptographic algorithms do not integrate well with policy systems, particularly without direct hardware or operating system integration. Such hardware or operating system integration is not easily achievable on distributed systems with a plurality of guest virtual computing systems because of lack of access to system hardware and/or operating system resources. Additionally, identifying and remediating restricted cryptographic algorithms implemented on distributed computing systems with the accompanying varied computing system environments is often problematic due to the nature of the computer system environments, making enforcement of consistent cryptographic policies on such systems difficult.

BRIEF DESCRIPTION OF THE DRAWINGS

Various embodiments in accordance with the present disclosure will be described with reference to the drawings, in which.

DETAILED DESCRIPTION

Figure 1:
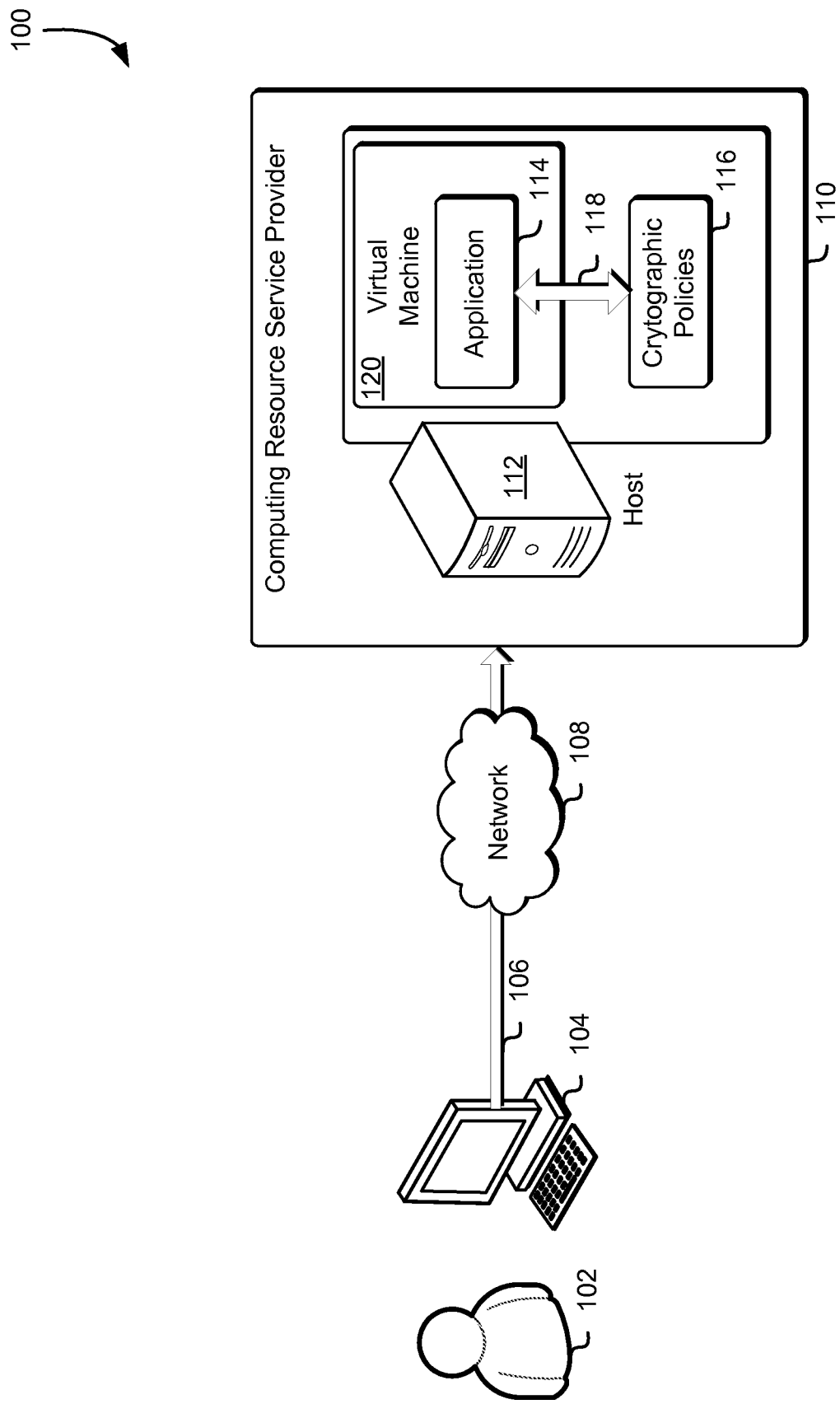
FIG. 1 illustrates an example environment where applications may be analyzed for cryptographic policy violations in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein include systems and methods for enforcing cryptographic policies in applications running on distributed systems under the control of a controlling domain such as a hypervisor. An application running on a virtual machine (VM) instance may be subject to a variety of system policies such as policies regarding access to cryptographic resources, access by users to such resources, allowed and/or disallowed cryptographic algorithms, minimal cryptographic security requirements and/or other such policies. An extensive and varied number of standards exist for computer-implemented cryptographic methods and an organization and/or system may wish to enforce policies associated with several of these standards.

Some implementations of cryptographic algorithms may be integrated with systems to enforce policy. For example, many applications integrate well with the Federal Information Processing Standard (FIPS) Publication 140-2 (FIPS PUB 140-2, also referred to herein simply as "FIPS") security standard and a system compliant with the standard may be referred to as "FIPS compliant." Deploying a system that is FIPS compliant generally involves deploying a FIPS compliant version of an operating system and then selecting only FIPS compliant applications on that system. Such a deployment, while conforming to the standard of FIPS PUB 140-2, is limited in that it may require alteration of the operating system, may require integration with system hardware, may restrict the use of many applications (including custom applications) and may not fully support a full subset of policy capabilities that may be contemplated by an organization. Some other implementations of cryptographic algorithms may not integrate well with systems to enforce policy, lacking support within operating systems or support for integration with policy systems. Additionally, both systems that integrate well and those that do not integrate well generally do not perform well at identifying unapproved and/or insufficiently secure use of cryptography algorithms that may be introduced into a system by users, services, procedures and/or other such computer system entities, making identifying and/or remediating unauthorized use of cryptography difficult.

Techniques described and suggested herein include techniques for enforcing cryptographic policies in applications running on distributed systems with a plurality of virtual machines operating under the control of a controlling domain such as a hypervisor. As used herein, unless otherwise stated or made clear from context, the term "hypervisor" may be understood to refer to the hypervisor and/or to one or more processes, applications, services and/or combinations thereof, running under the control of and/or in conjunction with the hypervisor. The hypervisor may first collect traces of computer executable instructions executed inside of a virtual machine running under the control of the hypervisor. A hypervisor may examine the computer executable instructions executed inside of a virtual machine running under its control by recording at least a subset of the computer executable instructions that are forwarded to the host computer hardware for execution as they are executed. In some embodiments, the hypervisor may organize the examining and recording of the computer executable instructions according to the CPU, the virtual CPU, the virtual machine, the application, the application thread, the application hyperthread and/or by other such groupings.

In some embodiments, the hypervisor may collect and/or record samples of computer executable instructions (also referred to herein simply as "sampling") by intermittently examining the contents of memory locations within the virtual machine to determine information such as which instruction is currently executing, the location of the instruction within memory, data being used by the instruction, parameters being used by the instruction, the time of execution and/or other such information. Sampling may be performed by the hypervisor, or by a process such as a trace collector running within, or under the control of, the hypervisor. In some embodiments, sampling may be started and stopped according to one or more system conditions. For example, sampling may be a resource intensive operation and, consequently, may be turned off when system resources are unavailable. Sampling may also be "turned down" (executed less frequently) when, for example, system resources are scarce, when well-known and/or verified applications are running, according to system policies or according to other such system conditions. Sampling may similarly be turned on or "turned up" (executed more frequently) as a result of one or more system polices or conditions. For example, a system configured for high-security use may always keep sampling turned on and fully turned up in order to ensure system security compliance while a system configured for lower-security use may sample less frequently. Sampling frequency may also be adjusted in response to one or more events that occur in a system. In some embodiments, sampling may be turned on and/or turned up when a new user accesses the system, or when a new and/or unrecognized application starts, or when suspicious activity is detected by one or more processes and/or services running on the computer system or when other such similar events occur. Sampling may also be turned off and/or turned down after such new processes, users, or applications have be examined and found to be acceptable. In some embodiments, sampling may always be turned off for certain users, modules and applications including, but not limited to, the guest operating system, administrative users, verified modules running under the control of the hypervisor and/or the guest operating system and other such trusted entities. In some embodiments, one or more of the policies relating to whether sampling occurs and the frequency at which sampling occurs may exist as part of cryptographic policies, as part of system policies, as part of hypervisor policies or in a combination of these and/or other such polices. As may be contemplated, the factors for adjusting sampling and/or sampling rates described herein are illustrative examples, and other such factors for adjusting sampling and/or sampling rates may be considered as within the scope of the present disclosure.

After a plurality of samples has been gathered by the hypervisor, sample analysis may begin. In some embodiments, the hypervisor may continue to gather samples while performing the analysis of the previous set of samples. The hypervisor may also suspend and/or turn down the sampling during analysis in, for example, scarce resource situations and, may also turn up the sampling during analysis if, for example, system security demands are high. The hypervisor may begin analysis by first creating a graph representation of the sampled computer executable instructions (the graph may also be referred to herein as a "walk-through" or as a "walk-through graph"), grouping the sampled computer executable instructions (also referred to herein as the "instructions") temporally, where the term graph is used in the mathematical sense, comprising a collection of vertices and edges connecting the vertices. So, for example, if at time "A", an application executes instruction "X", at time "B", an application executes instruction "Y" and at time "C", an application executes instruction "Z", and if times "A", "B", and "C" are close together, then the hypervisor may create a walk-through graph with vertices representing the instructions "X", "Y" and "Z", with edges representing the temporal connection between "X" and "Y" and between "Y" and "Z."

Structures of interest within the walk-through may include sets of instructions that are executed in a consistent pattern, with a consistent starting and stopping point, wherein the instructions executed are both temporally located (all occurring within a short period of time) and spatially located (all located near one another and generally executed in a consistent order). The hypervisor may look for certain structures that are executed multiple times, with consistent entry and exit points. In the above example, if instructions "X", "Y" and "Z" may be frequently executed and in that same order, with consistent entry and exit points, the hypervisor may flag and/or otherwise denote that repeated executed instruction set. The hypervisor may also flag and/or otherwise denote looping structures within the walk-through. If, for example, in the above mentioned instruction set, the application, after executing instruction "Z", repeatedly returned to execute instruction "X", followed by instruction "Y", followed by instruction "Z" again, this is a looping structure. After repeating the loop a number of times, the application may exit the loop and execute a different instruction (call it "W"). A hypervisor may flag and/or otherwise denote the repeated execution of "X-Y-Z" followed by a single execution of "W" as a recognizable execution pattern in the walk-through graph.

Loops may be identified by the hypervisor by identifying back edges in the walk through. A back edge is an edge of a graph which, in a depth-first traversal of the graph, points to a first vertex of a set of vertices that has already been traversed. A back edge is an indicator of a loop in a graph. Back edges may be indicated by an instruction order that is different than an expected instruction order. In the above example, with the "X"-"Y"-"Z" instruction set, the expected order of execution of the instructions is "X", followed by "Y", followed by "Z" (instructions "X", "Y" and "Z" are in that order, in the computer system memory of the virtual machine). When instruction "X" follows instruction "Z" in the loop, that edge of the walk-through graph may be contrary to the expected order and may indicate the possibility of a back-edge in the walk-through graph. Loops in the graph may correspond to loops in the executed code and may also be indicators of certain algorithms. Strong loops, where the same set of instructions may be executed in order, and a large number of times, may be indicated by graphs with multiple edges and/or by applying weights to temporal connection edges (edges between vertices that occur sequentially). For example, if the set of instructions "X"-"Y"-"Z" is executed one-hundred times in a row in a loop, there may be one-hundred edges between each of the instruction vertices. In some embodiments, the weight of repeated walk-through edges may be computed as a function of the number of repetitions of the associated pair of instructions such as, for example, a quadratic function, an exponential function, an inverse quadratic function, a logarithmic function and/or other such functional relationships.

After identifying loops, the hypervisor may next group computer executable instructions together into one or more functional groups based at least in part on the identified loop structures. In each of the groups, each of the sets of executable instructions may comprise instructions that share temporal and/or spatial locality. In the example described herein, the instructions "X", "Y" and "Z" may form a functional group based at least in part on their temporal and spatial locality as well as based, at least in part, on the identified loop structure. In some embodiments, instruction "W" may be included in the same functional group based at least in part on spatial locality and/or on temporal locality as being a common exit point of the "X"-"Y"-"Z" loop. The hypervisor and/or the trace analyzer may determine whether to include instruction "W" in the functional group based on policy, user preferences, administrator preferences, resource availability, computational complexity and/or other such disparate factors. In some embodiments, the hypervisor may select a subset of the groups for further analysis based at least in part on a variety of factors for the selection. The factors for selection of groups for further analysis include, but may not be limited to, a plurality of instructions sharing common data based on examining data transfer through one or more registers and/or memory locations specified in the computer executable instructions, a plurality of instructions sharing common parameters based on examining data transfer through one or more other registers and/or memory locations specified in the computer executable instructions, meta-sequences of instructions where group "A" of instructions temporally and/or spatially follows group "B" of instructions, one or more threshold values on intervening instructions that may be executed between the instructions in the group of instructions and/or between the meta-sequences of instructions and/or other such factors for selection for further analysis. As may be contemplated, the factors for selection of groups for further analysis described herein are merely illustrative examples, and other such factors for selection may be considered as within the scope of the present disclosure.

Next, the hypervisor may determine whether the instructions in the groups selected for further analysis may comprise at least a portion of the implementation of one or more cryptographic algorithms. The hypervisor may determine whether the instructions comprise at least a portion of one or more cryptographic algorithms by comparing the detected loop structures and the computer executable instructions in the groups selected for further analysis against one or more reference implementations of cryptographic algorithms that may be stored in a repository of reference implementations of cryptographic algorithms (also referred to herein as a cryptographic database). For example, if it is known that a cryptographic algorithm uses one or more different loop structures, a cryptographic database may store one or more reference implementations of those one or more different loop structures. For example, if the looped instruction set "X"-"Y"-"Z" mentioned above was selected for further analysis, the hypervisor may compare the looped instruction set against a repository of reference implementations of known cryptographic algorithms. The repository may contain reference implementations that say, for example, that the instructions "X", "Y" and "Z", executed in a loop and in that order, comprise at least a portion of a known implementation of a cryptographic algorithm. The repository may contain reference implementations for "X"-"Z"-"Y", or "X"-"Y"-"Q"-"Z" and/or other such ordered groupings of instructions and may also store indications as to whether such implementations do, do not and/or might indicate implementations of cryptographic algorithms. It should be noted that the examples of the "X"-"Y"-"Z" and other such computer executed instruction patterns mentioned herein are merely illustrative examples and are not meant to convey the scope or size of a group of related instructions. The number of instructions in a group of instructions may vary by implementation, by system, by type and scope of analysis and/or by other such factors.

The hypervisor may determine whether the instructions in the groups of instructions selected for further analysis may comprise at least a portion of an implementation of one or more cryptographic algorithms by, for example, lists of instructions against reference lists of instructions, comparing sequences of instructions against reference sequences of instructions, comparing loops of instructions against reference loops of instructions, comparing sequences of loops and/or sequences of instructions against reference sequences of loops and/or sequences of instructions and/or other such comparisons. The reference implementation may include a number of markers (also referred to herein as "patterns" or "fingerprints") for the hypervisor to compare groups of instructions against. For example, a reference implementation may indicate that any algorithm that executes instructions "X", "Y" and "Z", in that order, more than a threshold number of times, is probably a cryptographic algorithm. Another reference implementation may look at patterns in using a certain type of data in the algorithm. For example, a set of instructions which use a certain lookup table with known values to transform values may be an indicator of a cryptographic algorithm.

The hypervisor may use the patterns or fingerprints to determine the likelihood that a group of related instructions may comprise at least a portion of an implementation of a cryptographic algorithm. A group of instructions that strongly matches a reference implementation in the instructions used, the sequence of instructions, the lack of unfamiliar and/or out-of-sequence instructions, the looping structure, the sequence of loops and/or sequences, the data used and/or other such markers may indicate a strong likelihood that the group of instructions may comprise at least a portion of an implementation of a cryptographic algorithm. By contrast, a group of instructions that, for example, only partially matches the above factors or that has a large number of unfamiliar and/or out of sequence instructions may indicate a less-strong likelihood that the group of instructions may comprise at least a portion of an implementation of a cryptographic algorithm. In some embodiments, the hypervisor may assign one or more scores indicating a confidence level that the group of instructions may comprise at least a portion of an implementation of one or more reference cryptographic algorithms. A group of instructions may, for example, be a 25% match for one reference cryptographic algorithm, a 5% match for another, a 90% match for a third and a 99% match for a fourth.

In some embodiments, the hypervisor may use a variety of analysis tools to determine the likelihood that a group of instructions is at least similar to a reference implementation. For example, a graph of the group of instructions may be compared against a graph of the instructions in the reference implementation. Sequences of instructions may also be compared against sequences of instructions in the reference implementation. Where there are differences, the likelihood of a match may be computed by using similarity quantification techniques such as a distance metric, an edit distance (comparing the number of steps required to make two dissimilar objects the same), measurement of alignment (measuring deviation from a standard) and/or other such quantification techniques. As mentioned herein, there are several factors that the hypervisor may use to determine the likelihood that a group of instructions is similar to a reference implementation. For example, back edges may identify loop structures which, in turn, may be compared against reference loop structures. A loop structure that does not exactly conform to a reference loop structure, but that may be altered to exactly conform to a reference loop structure with a small number of changes (and a small distance metric or edit distance) may indicate a strong likelihood that the given loop structure may comprise at least a portion of an implementation of the cryptographic algorithm corresponding to the reference implementation. Similarly, close conformity of common entry and exit points from an algorithm, strongly correlated physical locality, strongly correlated temporal locality, presence and/or absence of intervening instructions and/or other such factors may be used by the hypervisor to assign one or more scores for the likelihood that a group of instructions may comprise at least a portion of an implementation of a cryptographic algorithm.

In some embodiments, the hypervisor may select one or more data parameters from gathered sample data and compare the one or more data parameters to a data model associated with a reference implementation. The presence or absence of data that is similar to data in a reference implementation may be used to increase or decrease the likelihood that a group of instructions and a group of associated data parameters comprise at least a portion of an implementation of a cryptographic algorithm. For example, a reference implementation of a cryptographic algorithm may require the presence of a lookup table to transform data values. A group of instructions that is similar to the reference implementation, but that does not include any such lookup table, may have a decreased likelihood of comprising an implementation of the reference cryptographic algorithm. Similarly, a group of instructions that is not very similar to the reference implementation, but that has a lookup table that is very similar to the reference lookup table, may have an increased likelihood of comprising an implementation of the reference cryptographic algorithm. In some embodiments selecting and/or comparing data parameters may be omitted if the reference implementation has no reference parameters or if the reference implementation indicates a match for all choices of data parameters.

Using the one or more likelihood scores based on the reference implementation and/or the comparison with the reference implementation data parameters, the hypervisor may next determine whether the likelihood that a group of instructions may comprise at least a portion of an implementation of a reference cryptographic algorithm is sufficient to consider whether that implementation may be prohibited by one or more cryptographic policies. In one embodiment, the hypervisor may evaluate the likelihood that a group of instructions may comprise at least a portion of an implementation of a reference cryptographic algorithm by first looking at the percentage of the samples whose likelihood score exceeds a certain threshold value. The threshold value may be used to prevent skewing of the average by samples that were taken when the virtual machine was performing some other action. Such samples are not likely to conform to any particular implementation of a reference cryptographic algorithm and thus, would skew the average with a 0% likelihood score. As an illustrative example, consider ten samples of an application that comprise at least a portion of an implementation of a reference cryptographic algorithm. Five of the samples may show that there is a 95% likelihood that the samples may comprise at least a portion of a reference cryptographic algorithm and five of the samples may show that there is a 5% likelihood that the samples may comprise at least a portion of a reference cryptographic algorithm. The 5% samples may be because at the time that the samples were taken, the virtual machine may have been performing a different function. The average may indicate that there is a 50% likelihood that the samples comprise at least a portion of the implementation of a reference cryptographic algorithm, but a much stronger indicator may be that 50% of the samples indicate that there is a 95% likelihood that the samples comprise at least a portion of the implementation of a reference cryptographic algorithm.

If it is determined that a group of instructions being executed by an application is likely to comprise at least a portion of an implementation of a reference cryptographic algorithm, the hypervisor may determine whether the cryptographic algorithm implementation is prohibited by a cryptographic policy based on the reference implementation and/or the data parameters. In the event that an implementation is prohibited by system policy, the likelihood score described above herein may be used to determine whether an application should be prevented from continuing to execute the cryptographic algorithm. One or more likelihood score conditions may be evaluated. A likelihood score condition is a condition based at least in part on computed likelihood scores and also based at least in part on one or more system policies. For example, a computer system may have a likelihood score condition indicating that if a percentage of the likelihood scores exceed a threshold value, one or more policy operations should be performed. In another example, a computer system may have a likelihood score condition indicating that if the maximum likelihood score is within one range of values, a first set of one or more policy operations should be performed and if the maximum likelihood score is within a different range of values, a second set of one or more policy operations should be performed. As may be contemplated, the examples of likelihood score conditions described herein are merely illustrative examples and other such likelihood score conditions may be considered as within the scope of the present disclosure.

In some embodiments, where the likelihood is low, the hypervisor may elect to continue sampling the application to see if the likelihood increases or decreases. An application may be put on a watch list where it is allowed to continue to execute, but sampling and analysis may continue. Policy determinations for how to react to various algorithms may vary. For example, some algorithms may always be disallowed if there is even a slight likelihood that the algorithm in question comprises at least a portion of the implementation of a reference cryptographic algorithm. Some algorithms may only be disallowed if the likelihood exceeds a certain threshold value. Some algorithms may be allowed for some data parameters and disallowed for other data parameters. For example, a system may have a cryptographic policy that a certain type of encryption may be used, but only if, for example, a cryptographic key associated with the cryptographic algorithm exceeds a certain minimum complexity. An application that uses a key that exceeds that minimum complexity may be allowed, while an application that uses a key that does not exceed that minimum complexity may not be allowed.

In some embodiments, if the hypervisor determines that an application is executing a disallowed cryptographic algorithm, the hypervisor may perform one or more operations to address the execution of the disallowed algorithm. The hypervisor may, for example, block execution of a portion of computer executable instructions by the virtual machine based at least in part on the determination that the implementation of the cryptographic algorithm is disallowed. The hypervisor may also shut down the virtual machine, suspend the application, notify an administrator, notify the user, notify the virtual machine, notify the application, notify an administrator of the machine or some other such action. In some embodiments the hypervisor may allow a grace period for the application and/or the guest computer system to remediate the violation and in others, the disallowed application may be quarantined immediately. As mentioned previously, the hypervisor may elect to turn on and/or turn up sampling for an application as needed. The hypervisor may also elect to turn on and/or turn up sampling for a user that was previously found to be executing a disallowed algorithm and/or for the virtual machine where a disallowed algorithm was previously executed. Similarly, the hypervisor may turn down or turn off analysis for an application that was analyzed and not found to contain any disallowed algorithms and/or data.

FIG. 1 illustrates an example environment 100 where one or more applications running on one or more computer systems within a computer system environment as well as the associated code running thereon may be verified by cryptographic policy enforcement implementations in accordance with at least one embodiment. A user 102 may connect 106 to a computer system through a computer system client device 104 and may initiate connection with or interaction with one or more applications 114 running on a host 112 operating within a computing resource service provider 110. In some embodiments, the computing resource service provider may provide a distributed, virtualized and/or datacenter environment within which one or more applications, processes, services, virtual machines and/or other such computer system entities may be executed. In some embodiments, the user 102 may be a person, or may be a process running on one or more remote computer systems, or may be some other computer system entity, user or process. The command or commands to connect to the computer system and/or to connect the applications running thereon may originate from an outside computer system and/or server, or may originate from an entity, user or process on a remote network location, or may originate from an entity, user or process within the computer system, or may originate from a user of the computer system client device 104, or may originate as a result of an automatic process or may originate as a result of a combination of these and/or other such originating entities. In some embodiments, the command or commands to initiate the connection 106 to the computing resource service provider 110 and/or an application 114 running thereon may be initiated by the computer system, without the intervention of a user 102. The command or commands to initiate the connection 106 to the host 112 and/or an application 114 running thereon may originate from the same origin as the command or commands to connect to the computing resource service provider 110 or may originate from another computer system and/or server, or may originate from a different entity, user or process on the same or a different remote network location, or may originate from a different entity, user or process within the computer system, or may originate from a different user of a computer system client device 104, or may originate as a result of a combination of these and/or other such same and/or different entities.

The user 102 may request connection to the computing resource service provider via one or more connections 106 and, in some embodiments, via one or more networks 108 and/or entities associated therewith, such as servers connected to the network, either directly or indirectly. The computer system client device 104 that may request access to the host computer system may include any device that is capable of connecting with a computer system via a network, including at least servers, laptops, mobile devices such as smartphones or tablets, other smart devices such as smart watches, smart televisions, set-top boxes, video game consoles and other such network enabled smart devices, distributed computing systems and components thereof, abstracted components such as guest computer systems or virtual machines and/or other types of computing devices and/or components. The network may include, for example, a local network, an internal network, a public network such as the Internet, a wide-area network, a wireless network, a mobile network, a satellite network, a distributed computing system with a plurality of network nodes and/or the like. The network may also operate in accordance with various protocols, such as those listed below, Bluetooth, WiFi, cellular network protocols, satellite network protocols and/or others.

The computing resource service provider 110 may provide access to one or more host machines as well as provide access to computer services such as virtual machine (VM) instances, automatic scaling groups, file-based database storage systems, block storage services, redundant data storage services, data archive services, data warehousing services, user access management services, content management services and/or other such computer system services as may be running thereon. The computing resource service provider 110 may also provide access to computer system resources such as user resources, policy resources, network resources and/or storage resources. In some distributed and/or virtualized computer system environments, the resources associated with the computer services may be physical devices, virtual devices, combinations of physical and/or virtual devices or other such device embodiments. In some embodiments, the host machines may be physical machines located within the computer system environment. In some embodiments, the host machines may be guest virtual machines operating on physical machines located within the computer system environment.

The application 114 may be running within a virtual machine 120 (also referred to herein as a "VM", a "guest virtual machine", "a guest machine") running on the host 112. A virtual machine is a computer system implemented in software which may be configured to execute one or more programs, services, applications, processes, modules and/or other such computer system entities. A virtual machine runs on a host computer system and may obtain access to host computer system hardware and resources in order to execute the one or more programs, services, applications, processes, modules and/or other such computer system entities. A virtual machine typically runs under the control of a controlling domain which also provides the access to host computer system hardware and resources. A virtual machine may be a general implementation of a computer system, with an operating system, user access, virtual memory, virtual hardware devices and/or other such computer system elements. A virtual machine may also be a specifically configured implementation of a computer system with only a minimal subset of the resources and capabilities that may be necessary to perform a specific task.

The application 114 may use one or more services, processes and/or applications also running on the virtual machine 120 and/or on the host 112 to connect 118 to a system on the host machine configured to at least enforce one or more cryptographic policies 116 on the system. The system that is configured to at least enforce one or more cryptographic policies (also referred to herein as the "cryptographic policy system") may be comprised of one or more subsystems. The subsystems may include, but not be limited to, one or more controlling domains such as a hypervisor, one or more repositories containing computer system policies, one or more repositories containing data used in enforcing policies, one or more processes, services or applications configured to perform one or more operations relating to enforcement of computer system cryptographic policies and/or other such computer system entities. The cryptographic policy system may selectively sample operation of the virtual machine 120 for computer executable instructions executed by the application 114 in order to determine whether the application 114 employs cryptographic algorithms. If the cryptographic policy system determines that an application does employ cryptographic algorithms, the cryptographic system may then determine if those cryptographic algorithms may be allowed or disallowed by policy and if disallowed, the cryptographic policy system may take one or more remediating actions in response to the determination and policy evaluation.

Figure 2:
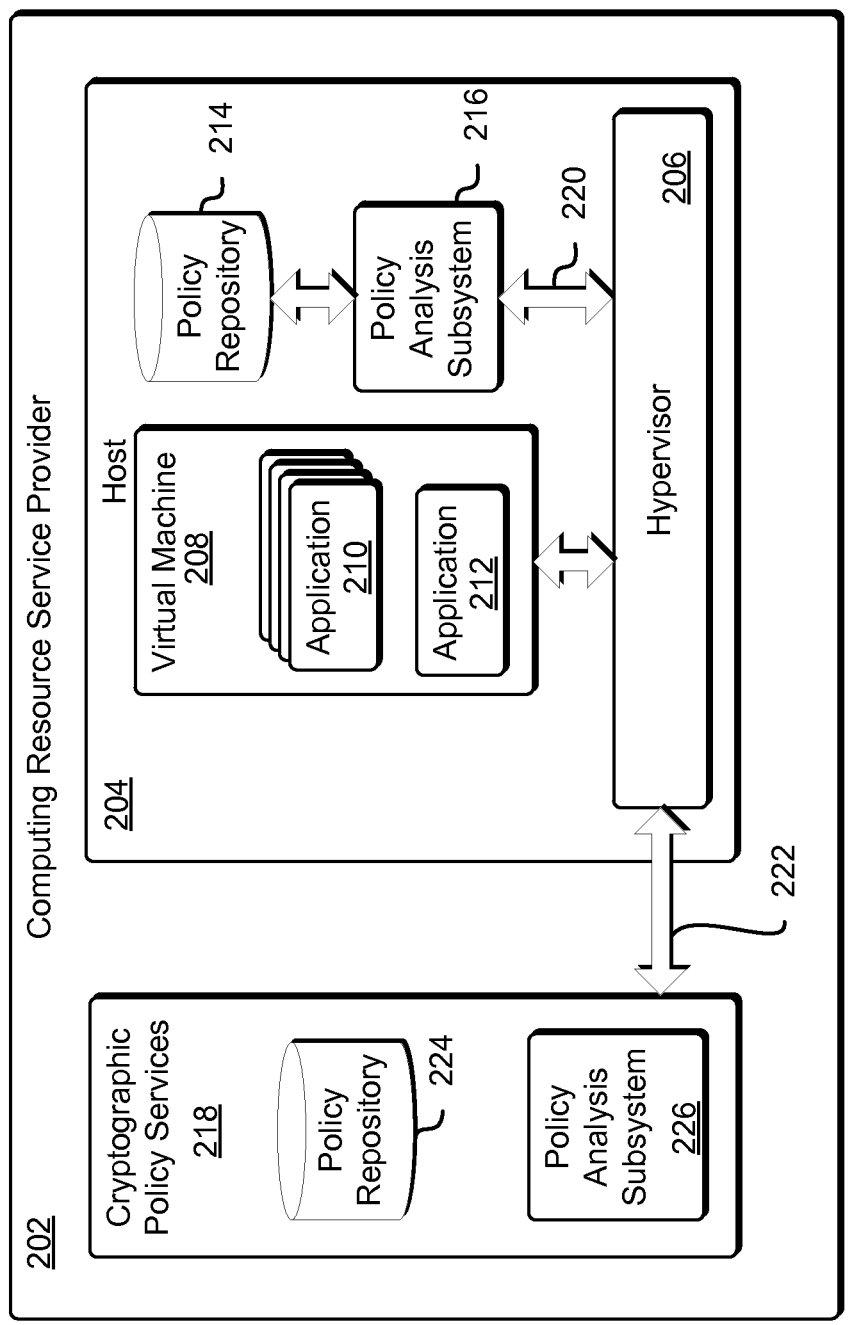
FIG. 2 illustrates an example environment where applications may be verified for conformance with cryptographic policies in accordance with at least one embodiment.

FIG. 2 illustrates an example environment 200 where applications running within a computer system may be verified for conformance with computer system cryptographic policies as described herein at least in connection with FIG. 1 and in accordance with at least one embodiment. An application 212 running on a virtual machine 208 may be one of one or more applications, including one or more other applications 210 running on the virtual machine 208. The application 212 may be running on the virtual machine 208, which may be running on a host 204 within computing resource service provider 202 as described herein at least in connection with FIG. 1 and in accordance with at least one embodiment. The virtual machine 208 may be running on the control of a controlling domain such a hypervisor 206. In an embodiment, a hypervisor is a controlling domain running on a host computer system that may provide access to computer system resources for guest virtual machine instances and their applications also running on the host computer system. A hypervisor typically has direct access to the host computer system resources and provides scheduled access by guests to those resources. For example, it is the hypervisor that provides system memory to guest computer systems and also manages that memory by reclaiming memory from the guest computer systems in the event that system memory becomes scarce. A hypervisor may also be called a controlling domain or domain-zero (DOM0) and typically runs as a privileged domain.

The hypervisor 206 may monitor the computer executable instructions executed on the virtual machine 208 including, but not limited to, the computer executable instructions executed by application 212. The hypervisor 206 may monitor the computer executable instructions to at least determine whether the application 212 may be executing one or more instructions that may comprise at least a portion of an implementation of a cryptographic algorithm. The hypervisor 206 may make this determination by connecting to one or more policy analysis systems that may be configured to identify violations of cryptographic policy and may also be configured to enforce such policies. In some embodiments, the hypervisor may connect 220 to a policy analysis subsystem 216 running on the host computer system 204. The policy analysis subsystem may in turn connect to a policy repository 214, which may be one of one or more policy repositories on the host computer system 204. The policy analysis subsystem may include one or more systems configured to record and analyze executable instructions, one or more subsystems to detect cryptographic policy violations, one or more subsystems configured to respond to cryptographic policy violations and/or one or more other cryptographic policy subsystems. The policy repository 214 may include one or more repositories of reference cryptographic algorithm implementations, one or more repositories of system policy rules, one or more repositories of reference cryptographic data and/or one or more other cryptographic policy repositories. In some embodiments, the hypervisor may connect 222 to one or more cryptographic policy services 218 running within the computing resource service provider 202 on one or more other computer systems. The cryptographic policy services may also include a policy analysis subsystem 226 and one or more policy repositories 224. In some embodiments, the hypervisor may use a combination of on-host and off-host policy analysis subsystems and policy repositories.

Figure 3:
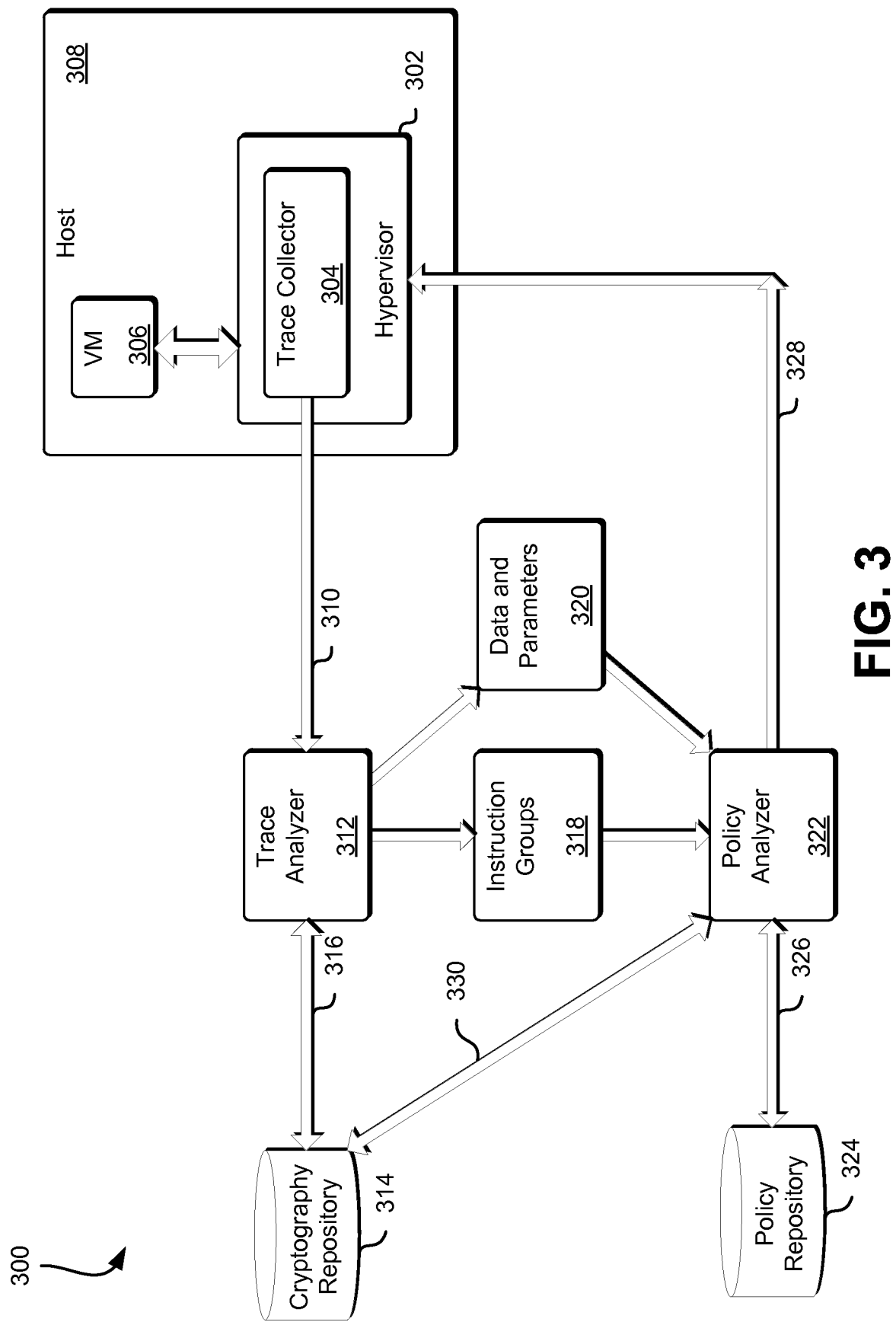
FIG. 3 illustrates an example environment where computer executable instructions may be collected and analyzed in accordance with at least one embodiment.

FIG. 3 illustrates an example environment 300 where computer executable instructions may be collected and analyzed to determine whether an application may be executing instructions that may comprise at least a portion of the implementation of a cryptographic algorithm as described herein at least in connection with FIG. 1 and in accordance with at least one embodiment. A hypervisor 302 may contain a trace collector 304 which may be a module, service, process, application, device or combination of these and/or other such operational computer system entities as described herein below. A trace collector 304 may configured to sample and record computer executable instructions and/or data referenced by the computer executable instructions, from applications running on a VM 306 which may be one of one or more VMs running on a host computer system 308. In some embodiments, the trace collector 304 may be running on the host computer system 308, within and/or under control of the hypervisor 302.

The trace collector 304 may forward 310 sampled and recorded computer executable instructions to a trace analyzer 312 which may be a module, service, process, application, device or combination of these and/or other such operational computer system entities as described herein below. A trace analyzer 312 may be configured to receive the sampled and recorded computer executable instructions and may also be configured to begin the analysis of the sampled and recorded computer executable instructions. In some embodiments, the trace analyzer 312 may be running on the host computer system 308, within and/or under the control of the hypervisor 302. In some embodiments, the trace analyzer 312 may be running on a different computer system entity as described herein above.

The trace analyzer 312 may receive the sampled and recorded computer executable instructions and may first process and then analyze the instructions by, for example, arranging them into groups and/or representing them as subgraphs and analyzing the resulting representations. The trace analyzer 312 may be connected 316 to and/or otherwise have access to a cryptography repository 314 which may contain data relating to one or more cryptographic algorithms that may be used to process and/or analyze the groups of instructions. Data in the cryptography repository may include, but not be limited to, descriptions of cryptographic algorithms, reference implementations cryptographic algorithms, example data used in cryptographic algorithms, example parameters used in cryptographic algorithms and/or other such cryptography related data. In some embodiments, the cryptography repository 314 may include one or more databases configured to provide organization of and/or access to the data in the cryptographic repository.

The trace analyzer 312 may select at least a portion of the processed and analyzed instructions received from the trace collector 304 and may send these selected instruction groups 318 to a policy analyzer 322 which may be a module, service, process, application, device or combination of these and/or other such operational computer system entities as described herein below. A policy analyzer 322 may be configured to analyze the selected groups 318 to determine whether the selected groups comprise at least a portion of an implementation of a cryptographic algorithm. In some embodiments the trace analyzer 312 may also select at least a portion of the data and parameters received from the trace collector 304 and send the selected data and parameters 320 to the policy analyzer 322. The policy analyzer may be connected to 326 and/or otherwise have access to a policy repository 326 which may contain data relating to one or more system cryptographic policies. Data in the policy repository may include, but not be limited to, policy rules, policy mitigation strategies, policy related data, allowed lists of applications, disallowed lists of applications, allowed lists of users, disallowed lists of users and/or other such policy data. In some embodiments, the policy repository 324 may include one or more databases configured to provide organization of and/or access to the data in the cryptographic repository. The policy analyzer 322 may be connected to 330 and/or otherwise have access to the cryptography repository 314 described herein above. In some embodiments, the cryptography repository 314 and the policy repository 324 may be the same entity.

As a result of analyzing the selected groups 318 and, in some embodiments, the data and parameters 320, the policy analyzer 322 may determine that an application running on the VM 306 may be executing one or more disallowed cryptographic applications. The policy analyzer may perform one or more operations to halt and/or otherwise mitigate the execution of the one or more disallowed cryptographic applications by sending one or more messages and/or commands 328 to the hypervisor 302. The messages and/or commands 328 may include, but not be limited to, commands to halt the application, commands to halt the virtual machine, messages to a user and/or process on the virtual machine, administrative messages to a privileged user and/or process on the virtual machine or other such messages and/or commands. The hypervisor 302 may be configured to at least receive and process such mitigating messages and/or command.

As mentioned previously in this disclosure, the components described herein at least in connection with FIG. 3 such as the trace collector 304, the trace analyzer 312 and the policy analyzer 322 may be a computer system modules, services, processes, applications, devices or combinations of these and/or other such operational computer system entities. In some embodiments, these components may be operational computer system entities running within and/or under the control of a controlling domain such as a hypervisor, or running within and/or under the control of a guest operating system, or running as, within and/or under the control of a separate operational computer system entity or running as, within and/or under the control of some other such computer system entity. Additionally, it should be understood that while this disclosure may describe the components such as the trace collector 304, the trace analyzer 312 and the policy analyzer 322 performing one or more operations, functions, processes and/or other such actions, a computer system configured in accordance with the component may be performing the described actions.

Figure 4:
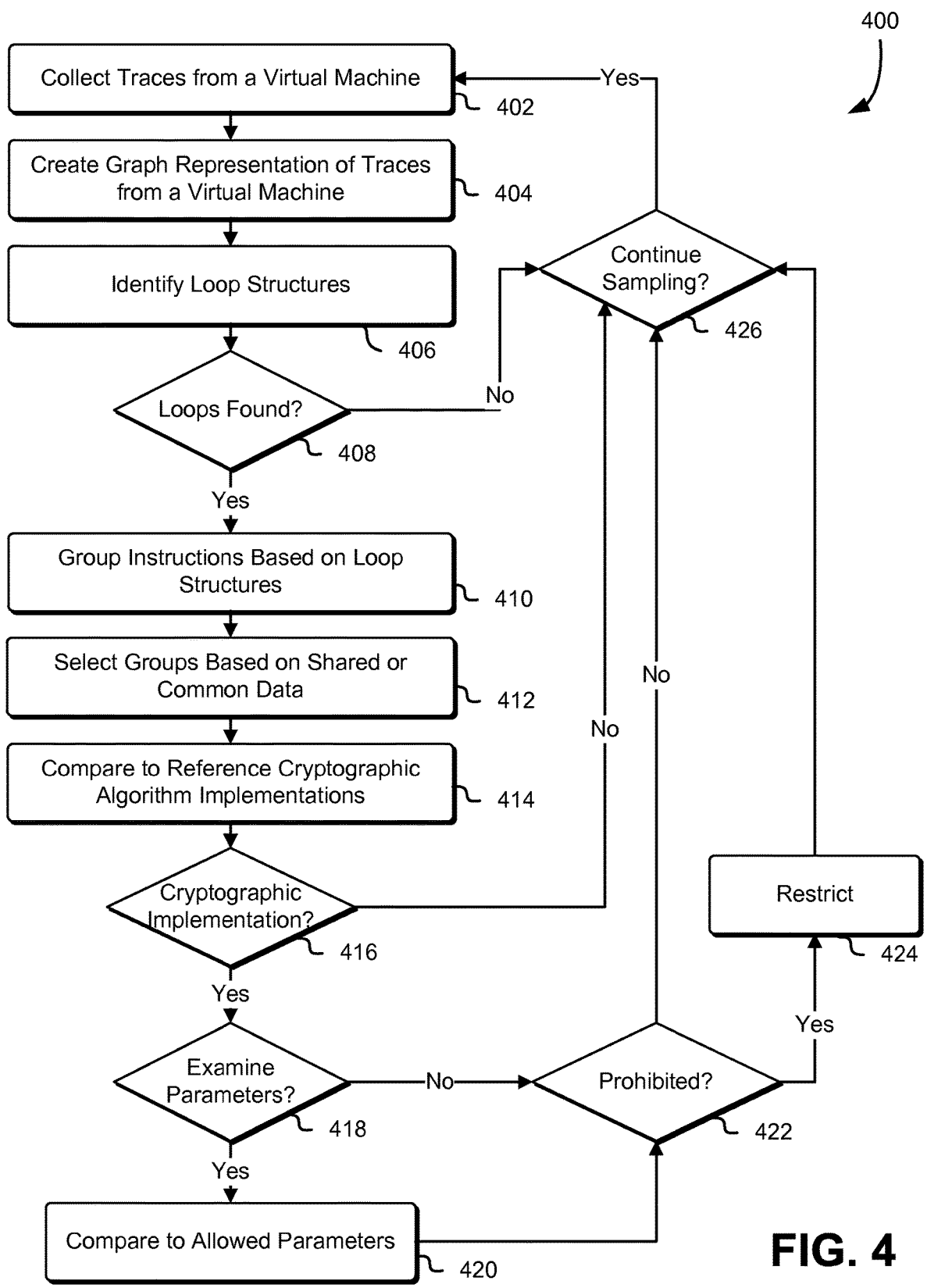
FIG. 4 illustrates an example process for collecting and analyzing computer executable instructions to determine the presence of cryptographic algorithms in accordance with at least one embodiment.

FIG. 4 illustrates an example process 400 for collecting and analyzing computer executable instructions to determine whether an application may be executing cryptographic algorithms as described at least in connection with FIG. 1 and in accordance with at least one embodiment. A controlling domain such as the hypervisor 302 as described at least in connection with FIG. 3 may perform some or all parts of the process illustrated in FIG. 4. A service such as the trace collector 304 as described at least in connection with FIG. 3 may also perform some or all parts of the process illustrated in FIG. 4. A service such as trace analyzer 312 illustrated at least in connection with FIG. 3 may also perform some or all parts of the process illustrated in FIG. 4. A service such as policy analyzer 332 illustrated at least in connection with FIG. 3 may also perform some or all parts of the process illustrated in FIG. 4. Other services and/or processes running on a computer system may also perform some or all parts of the process illustrated in FIG. 4 including, but not limited to, applications, processes and/or services running on host and/or virtual machines within the computer system, operating system elements of host and/or virtual machines within the computer system, dedicated network hardware on the computer system, controlling domains such as a hypervisor and/or combinations of these and/or other such operational entities within the computer system.

A trace collector may collect traces from a virtual machine 402, including traces of computer executable instructions, parameters, data and/or other such trace data. The trace collector may collect instructions, parameters, data and/or other such trace data by intermittent sampling, or by constant sampling or by some other such collection method. A trace analyzer may then create a graph representation 404 of the traces from the virtual machine and may identify loop structures 406 using the information in the graph representation. If candidate loop structures are found 408, the trace analyzer may then group the computer executable instructions based on the loop structures 410. The trace analyzer may then select one or more of the groups based at least in part on shared or common data 412. The group selection may be based on data received from the trace collector, or may be based on data stored in a cryptography repository such as the cryptography repository 314 described herein at least in connection with FIG. 3 or may be based on a combination of data from these and/or other such data sources.

The trace analyzer may then compare the selected groups to one or more reference cryptographic algorithm implementations 414 to determine whether the selected groups comprise at least a portion of a reference cryptographic algorithm implementation. The reference cryptographic algorithm implementation may be stored in a cryptography repository such as the cryptography repository 314 described herein at least in connection with FIG. 3. In some embodiments, the trace analyzer may also use data and/or parameters received from the trace collector to determine whether the selected groups comprise at least a portion of the reference cryptographic algorithm implementation. If it is determined that one or more of the selected groups comprise at least a portion of a reference cryptographic algorithm implementation 416, a policy may determine whether the one or more parameters associated with the selected groups should be examined 418. In some embodiments, a reference cryptographic algorithm implementation may be disallowed for all parameters, or may be disallowed for some parameters and allowed for others or may be allowed for all parameters. If the parameters should be examined 418, the policy analyzer may compare the parameters to allowed parameters 420.

If as a result of determining that a group of instructions and optionally, the associated parameters, comprise at least a portion of a reference cryptographic algorithm implementation, the policy analyzer may determine whether one or more policies of the system prohibit 422 the execution of such an algorithm. If the algorithm is prohibited, the policy analyzer may direct a controlling domain such as a hypervisor to restrict 424 or mitigate the execution of the application by, for example, halting the execution of the application, halting the virtual machine or other such restricting and/or mitigating actions. At a number of steps in the process described herein, the process may determine whether sampling should continue 426 including, but not limited to, after no candidate loop structures are found 408, after it is determined that none of the selected groups comprise at least a portion of a reference cryptographic algorithm implementation 416, after it is determined that none of the policies of the system prohibit 422 the execution of a found cryptographic algorithm or after steps are taken to restrict 424 or mitigate the execution of the algorithm.

Figure 5:
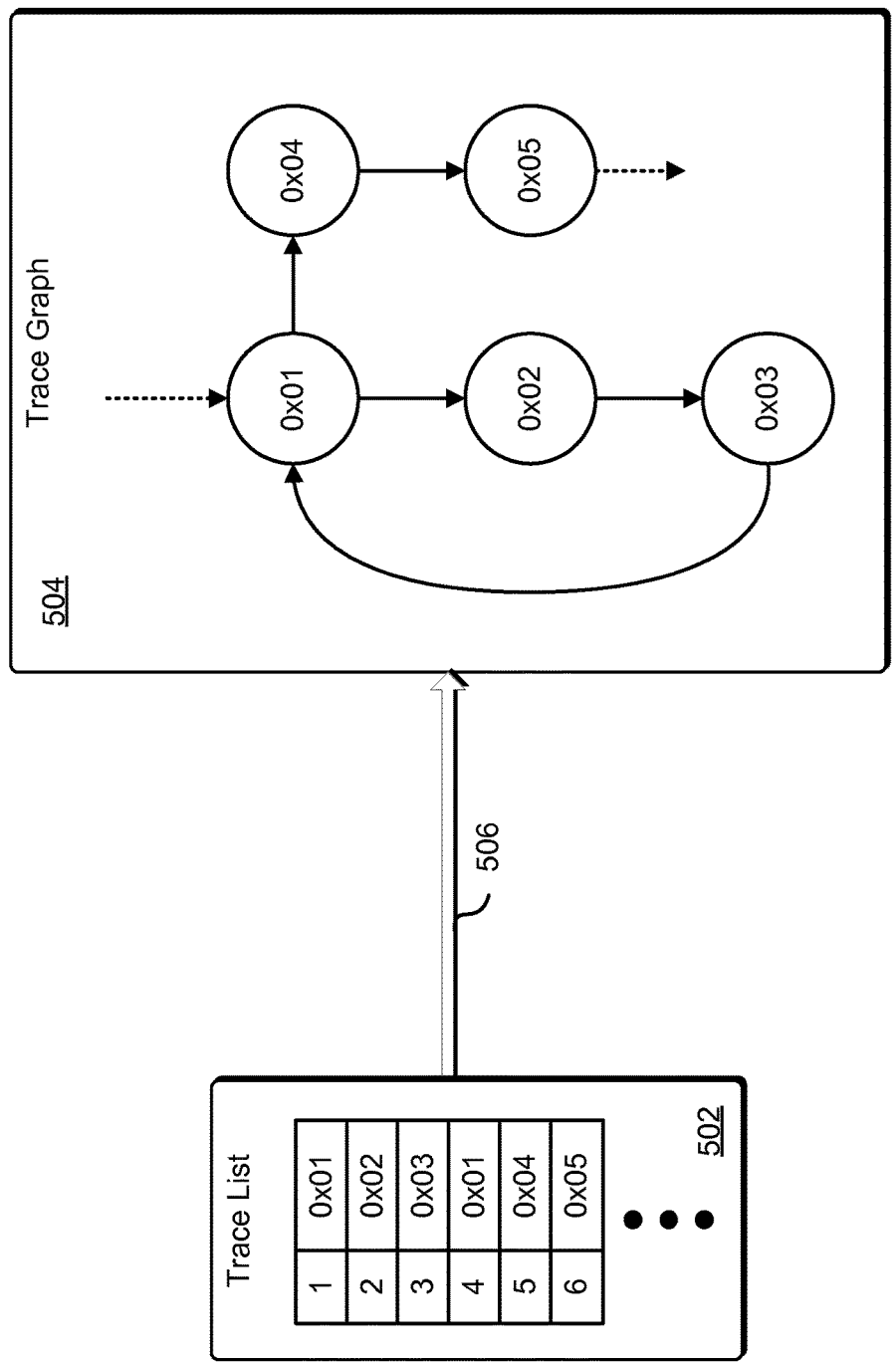
FIG. 5 illustrates an example environment where a trace of a group of computer executable instructions may be represented by a graph in accordance with at least one embodiment.

FIG. 5 illustrates an example environment 500 where a trace of a group of computer executable instructions may be represented by a graph as described herein at least in connection with FIG. 4 and in accordance with at least one embodiment. A trace list 502 may include a sequential list of sampled information about one or more computer executable instructions. Each element in the sequential list (referred to herein simply as an "execution trace") may contain information about a computer executable instruction that may have been executed in one or more virtual machines. The information about the computer executable instruction may have been collected by a computer system entity such as the trace collector 304 described herein at least in connection with FIG. 3. Each execution trace may have been collected by the trace collector by sampling one or more memory locations as described herein above. The trace list 502 may be converted 506 to a trace graph 504 representation by a computer system entity such as the trace analyzer 312 described herein at least in connection with FIG. 3.

The trace graph 504 illustrated in FIG. 5 has vertices (also referred to herein as "nodes") corresponding to the instructions in the trace list 502 and edges corresponding to the sequential execution of the pairs of instructions. The directed edge between the vertex labeled "0x01" in trace graph 504 and the vertex labeled "0x02" in trace graph 504 indicates that instruction 0x02 was executed immediately after instruction 0x01 in the trace list 502 (instructions 1 and 2 in the trace list). Similarly, the directed edge between the vertex labeled "0x02" in trace graph 504 and the vertex labeled "0x03" in trace graph 504 indicates that instruction 0x03 was executed immediately after instruction 0x02 in the trace list 502 (instructions 2 and 3 in the trace list). The directed edge between the vertex labeled "0x03" in trace graph 504 and the vertex labeled "0x01" in trace graph 504 is a back edge as described herein above, representing a sequential order that may be contrary to the expected temporal order and one that, in this example, indicates a loop in the sequence of instruction execution. The dashed directed edge entering into the vertex labeled "0x01" in trace graph 504 indicates that instruction 0x01 is an entry point of the trace. The dashed directed edge exiting out of the vertex labeled "0x05" in trace graph 504 indicates that instruction 0x05 is an exit point of the trace.

Figure 6:
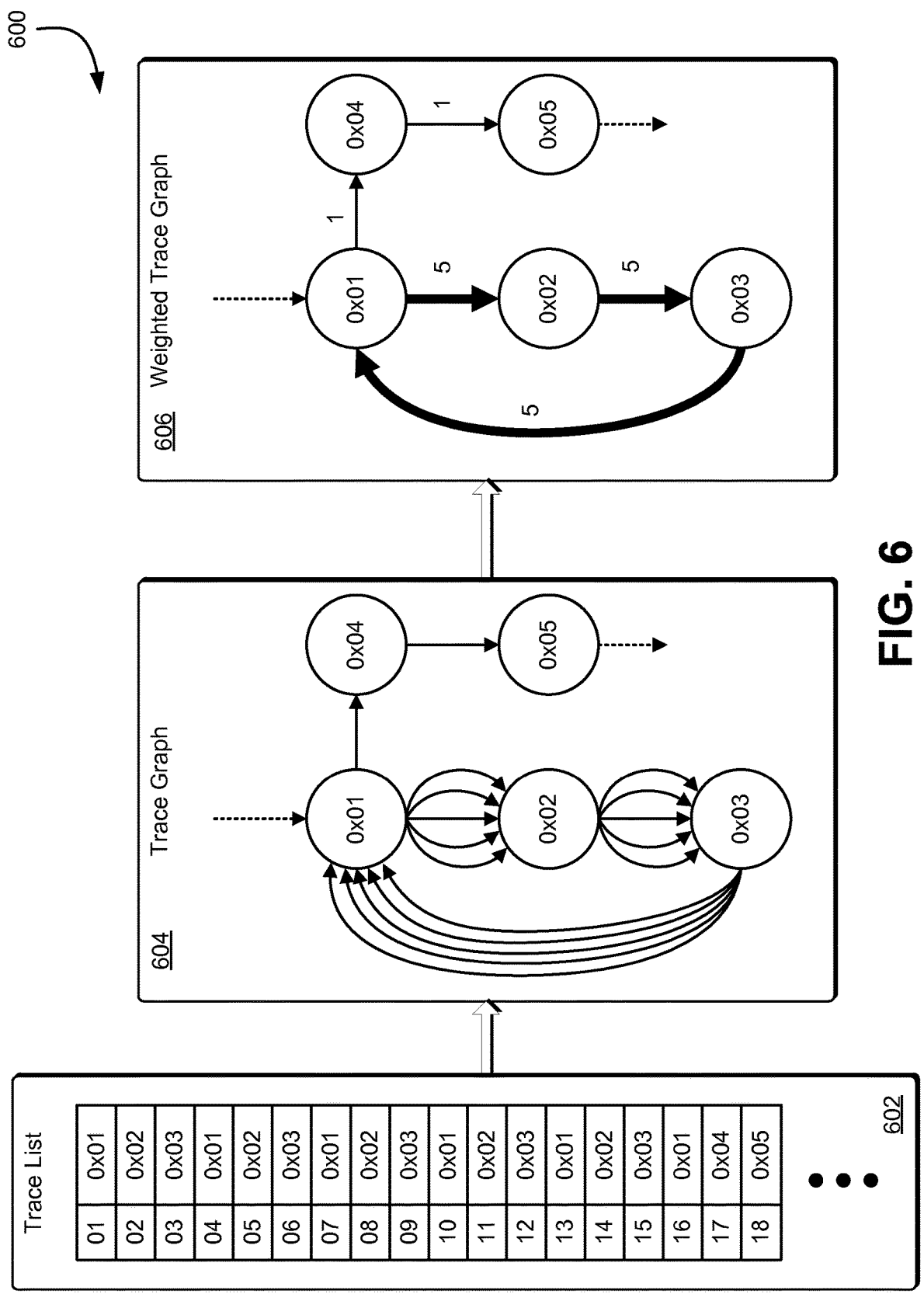
FIG. 6 illustrates an example environment where a trace of a group of computer executable instructions may be weighted by a multiple-edge and a weighted graph in accordance with at least one embodiment.

FIG. 6 illustrates an example environment 600 where a trace of a group of computer executable instructions may be represented by a graph with multiple edges and may also be represented by a graph with weighted edges as described herein at least in connection with FIGS. 4 and 5, and in accordance with at least one embodiment. The trace list 602 may be represented by the trace graph 604, with the plurality of edges (in this example, five edges) between vertex "0x01" and vertex "0x02", between vertex "0x02" and vertex "0x03" and between vertex "0x03" and vertex "0x01". There are five edges between each of these pairs of vertices in trace graph 504 because the trace list 502 contains five instances of the instruction sequence 0x01, 0x02, 0x03 and back to 0x01. The trace graph 604, with multiple edges may also be represented by the weighted trace graph 606 with weighted edges, where the five edges between, for example, vertex "0x01" and vertex "0x02" may be replaced by a single weighted edge with weight five.

Figure 7:
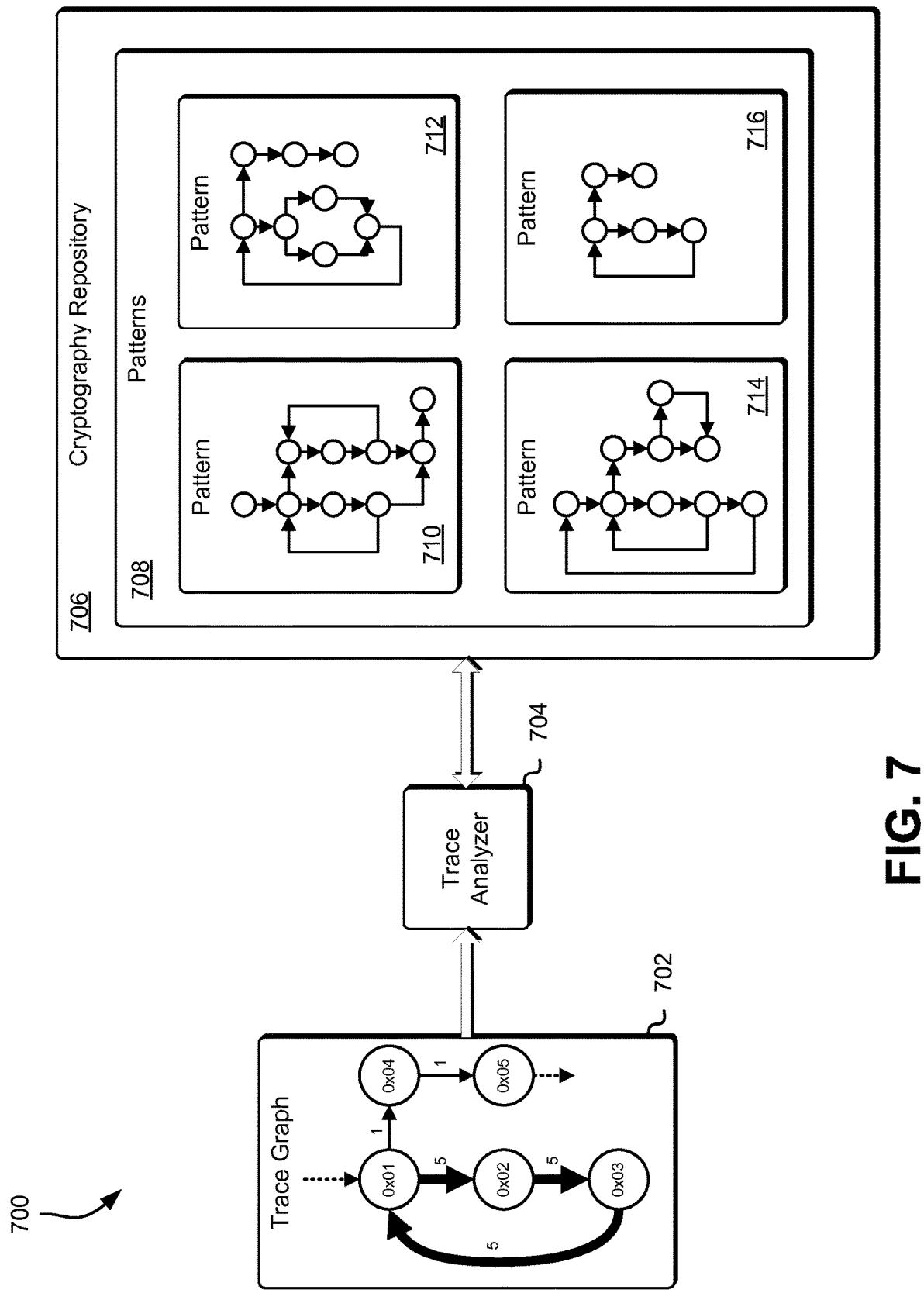
FIG. 7 illustrates an example environment where a trace graph may be analyzed in accordance with at least one embodiment.

FIG. 7 illustrates an example environment 700 where a trace graph may be analyzed by comparing it to one or more reference patterns as described herein at least in connection with FIG. 3 and in accordance with at least one embodiment. A trace graph 702 such as the trace graph 604 or the weighted trace graph 606 described herein in connection with FIG. 6 may be analyzed by a trace analyzer 704 such as the trace analyzer 312 described herein at least in connection with FIG. 3. The trace analyzer 704 may be connected to and/or otherwise have access to a cryptography repository 706 such as the cryptography repository 314 described herein at least in connection with FIG. 3. In some embodiments, the cryptography repository may contain one or more patterns 708 which the trace analyzer 704 may compare the trace graph 702 against. The comparisons of the trace graph 702 against the patterns 708 in the cryptography repository 706 may be used to determine whether the sequence of execution traces represented by the trace graph 702 corresponds to one or more of the patterns 708 and thus, whether an application running on a virtual machine that the sampled sequence of execution traces came from may be running a restricted algorithm as described herein at least in connection with FIG. 3 and in accordance with at least one embodiment.

In some embodiments, the trace analyzer may use one or more comparison and/or measurement techniques to determine whether the sequence of execution traces represented by the trace graph 702 corresponds to one or more of the patterns 708, how similar the sequence of execution traces represented by the trace graph 702 is to one or more of the patterns 708 and thus, how likely is it that an application running on a virtual machine that the sampled sequence of execution traces came from may be running a restricted algorithm. One measurement technique, an edit distance, may be used to measure the similarity between two graphs by determining, for example, the number of additions and/or deletions of vertices and/or edges that may be required to convert one graph to another. In the example illustrated in FIG. 7, the edit distance between trace graph 702 and pattern 710 may be eight, the edit distance between trace graph 702 and pattern 712 may be six, the edit distance between trace graph 702 and pattern 714 may be eight and the edit distance between trace graph 702 and pattern 716 may be zero. The trace analyzer may use these edit distances to determine that it very likely that the application running on the virtual machine is running a restricted algorithm corresponding to pattern 716 and it is much less likely that the application running on the virtual machine is running restricted algorithms corresponding to pattern 710, pattern 712 or pattern 714. As may be contemplated, the comparison technique described herein is merely an illustrative example, and other such comparison and/or measurement techniques for determining the similarity between two graphs may be considered as within the scope of the present disclosure.

Figure 8:
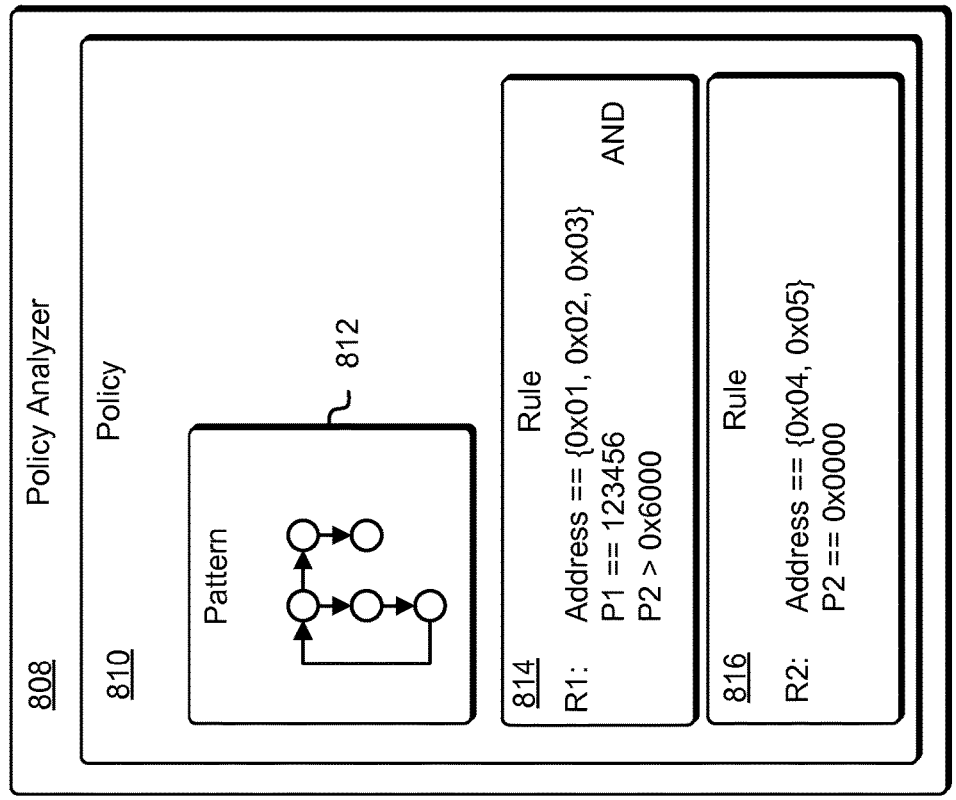
FIG. 8 illustrates an example environment where a trace graph with patterns may be analyzed in accordance with at least one embodiment.

FIG. 8 illustrates an example environment 800 where a trace graph with parameters may be analyzed by a policy analyzer as described herein at least in connection with FIG. 3 and in accordance with at least one embodiment. The trace list 802 containing instructions 804 and parameters 806 may have been analyzed by a trace analyzer as described herein at least in connection with FIG. 3 and that analysis may have found a strong likelihood that an application running on a virtual machine where the computer executable instructions contained in trace list 802 were sampled from is running a restricted algorithm corresponding to pattern 812. A policy analyzer 808 such as the policy analyzer 322 described herein at least in connection with FIG. 3 may have one or more policies associated with pattern 812 including, for example, the policy 810 which may contain the pattern 812 and one or more rules regarding acceptable use of the pattern 812. For example, the rule R1 814 says that, for computer executable instructions 0x01, 0x02 and 0x03, the instructions must use a certain value for parameter P1 and must use a certain value for parameter P2 and the rule R2 816 says that, for computer executable instructions 0x04 and 0x05, the instructions must use a certain value for parameter P2. In the example illustrated in FIG. 8, five out of six of the execution traces violate the rules. In some embodiments, one or more violations of these rules may indicate one or more remediation actions as described herein at least in connection with FIG. 3 and in accordance with at least one embodiment. As may be contemplated, the rules described herein are merely illustrative examples, and other such rules may be considered as within the scope of the present disclosure.

Figure 9:
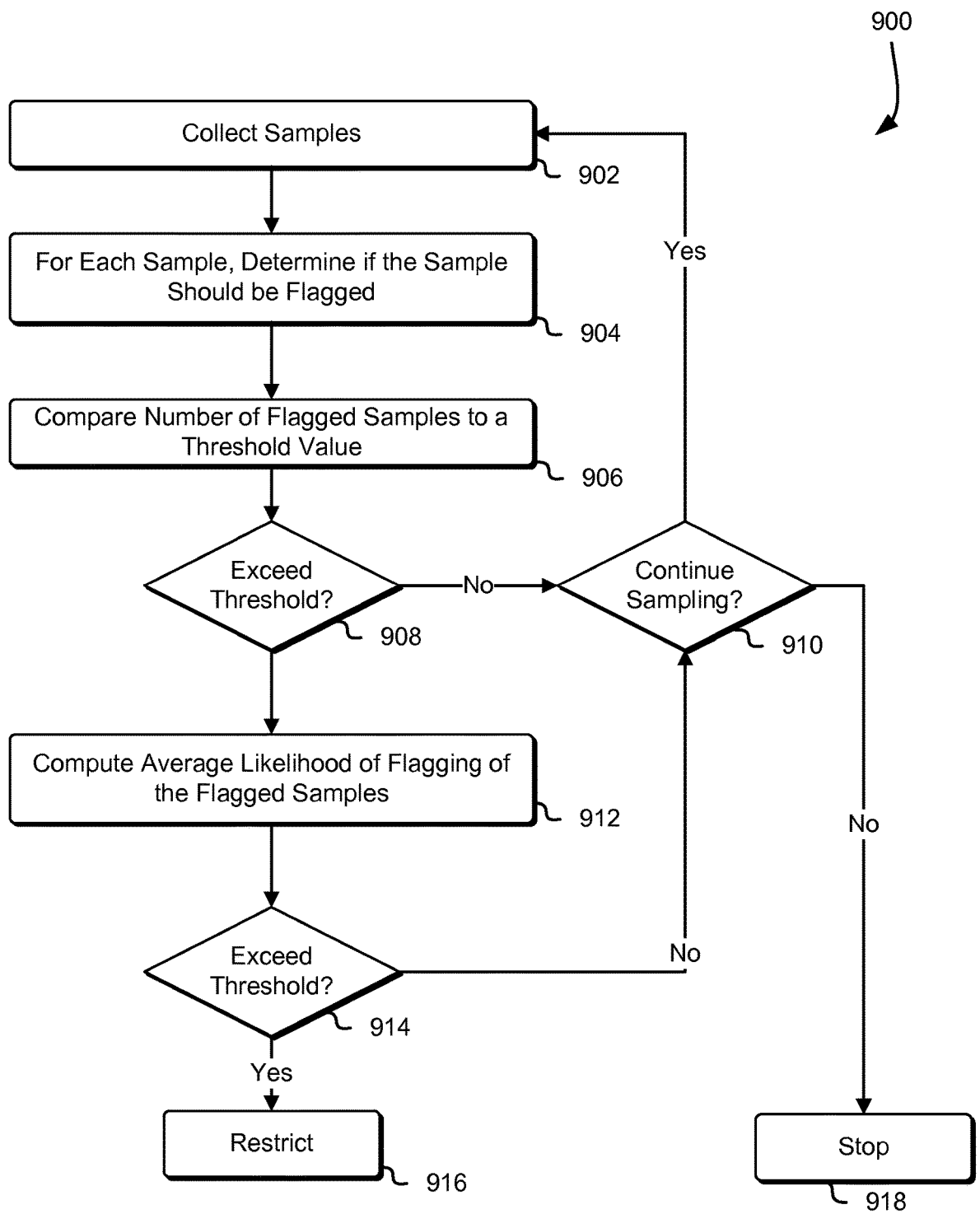
FIG. 9 illustrates an example process for computing the likelihood that a group of computer executable instructions comprise at least a portion of a cryptographic algorithm in accordance with at least one embodiment.

FIG. 9 illustrates an example process 900 for computing the likelihood that a group of computer executable instructions may comprise at least a portion of the implementation of a cryptographic algorithm as described herein at least in connection with FIG. 3 and in accordance with at least one embodiment. A controlling domain such as the hypervisor 302 as described at least in connection with FIG. 3 may perform some or all parts of the process illustrated in FIG. 9. A service such as the trace collector 304 as described at least in connection with FIG. 3 may also perform some or all parts of the process illustrated in FIG. 9. A service such as trace analyzer 312 illustrated at least in connection with FIG. 3 may also perform some or all parts of the process illustrated in FIG. 9. A service such as policy analyzer 332 illustrated at least in connection with FIG. 3 may also perform some or all parts of the process illustrated in FIG. 9. Other services and/or processes running on a computer system may also perform some or all parts of the process illustrated in FIG. 9 including, but not limited to, applications, processes and/or services running on host and/or virtual machines within the computer system, operating system elements of host and/or virtual machines within the computer system, dedicated network hardware on the computer system, controlling domains such as a hypervisor and/or combinations of these and/or other such operational entities within the computer system.

A trace collector may collect one or more samples 902. A trace analyzer may, for each sample collected, determine whether the sample should be flagged 904 based on, for example, there being a certain likelihood that the sample may include one or more instructions that comprise at least a part of an algorithm such as a cryptographic algorithm and that may be restricted by one or more policies such as cryptographic policies. The trace analyzer may then compare the number of flagged samples to a first threshold value 906 to determine whether that number of flagged samples exceeds the first threshold value 908. If the number of flagged samples exceeds the threshold value, the trace analyzer may compute a statistical measure of whether a flagged sample was flagged 912 as described herein above. If that statistical measure exceeds a second threshold value 914, one or more operations may be executed by the hypervisor to restrict the algorithm 916. The statistical measure may include an average, an arithmetic mean, a median, a time-weighted average, a histogram or a combination of these and/or some other such statistical measures. If thresholds are not exceeded, and if it is determined that sampling should be continued 910, the trace collector may once again collect one or more samples 902. If it is determine that sampling should not continue, then sampling will stopped and/or suspended 918.

Figure 10:
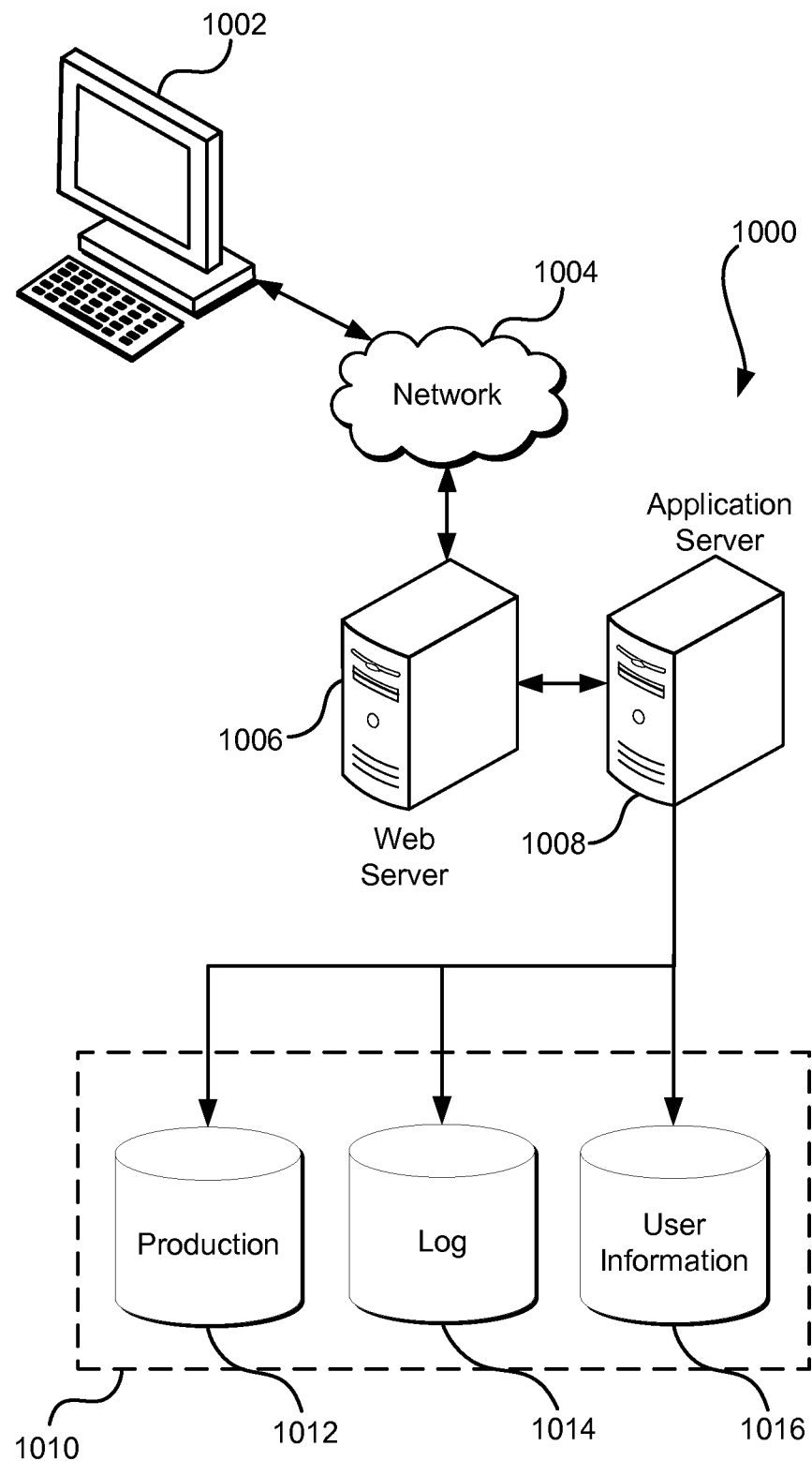
FIG. 10 illustrates an environment in which various embodiments can be implemented.

FIG. 10 illustrates aspects of an example environment 1000 for implementing aspects in accordance with various embodiments. As will be appreciated, although a web-based environment is used for purposes of explanation, different environments may be used, as appropriate, to implement various embodiments. The environment includes an electronic client device 1002, which can include any appropriate device operable to send and/or receive requests, messages or information over an appropriate network 1004 and, in some embodiments, convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 1006 for receiving requests and serving content in response thereto, although for other networks an alternative device serving a similar purpose could be used as would be apparent to one of ordinary skill in the art.

The illustrative environment includes at least one application server 1008 and a data store 1010. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 1002 and the application server 1008, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 1010 can include several separate data tables, databases, data documents, dynamic data storage schemes and/or other data storage mechanisms and media for storing data relating to a particular aspect of the present disclosure. For example, the data store illustrated may include mechanisms for storing production data 1012 and user information 1016, which can be used to serve content for the production side. The data store also is shown to include a mechanism for storing log data 1014, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. The application server 1008 may provide static, dynamic or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 1002. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers and business application servers. The server(s) also may be capable of executing programs or scripts in response to requests from user devices, such as by executing one or more web applications that may be implemented as one or more scripts or programs written in any programming language, such as Java®, C, C # or C++, or any scripting language, such as Ruby, PHP, Perl, Python or TCL, as well as combinations thereof. The server(s) may also include database servers, including without limitation those commercially available from Oracle °, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method, comprising:
    identifying, based at least in part on computer executable instructions executing on a computer system, a plurality of execution traces;
    obtaining information from the plurality of execution traces to determine whether the plurality of execution traces match a reference pattern corresponding to an algorithm that is restricted by one or more system policies;
    determining whether the plurality of identified execution traces satisfies a set of conditions associated with the one or more system policies; and
    causing the computer system to perform one or more actions based at least in part on the determination.

2. The computer-implemented method of claim 1, wherein the set of conditions further comprise determining whether a number of the plurality of identified execution traces exceeds a threshold value.

3. The computer-implemented method of claim 2, further comprising computing a statistical measure for the plurality of identified execution traces based at least in part on determining that the number of the plurality of identified execution traces exceeds the threshold value.

4. The computer-implemented method of claim 3, further comprising:
    determining that the statistical measure satisfies a second set of conditions; and
    causing the computer system to perform the one or more actions based at least in part on the determination.

5. A system, comprising:
    one or more processors; and
    memory to store instructions that, as a result of being executed by the one or more processors of the system, cause the system to:
        identify, based at least in part on computer executable instructions executing on a computer system, information from a plurality of execution traces;
        determine, based at least in part on the information, whether the plurality of execution traces match a reference pattern that is indicative of an algorithm that is restricted by one or more system policies; and
        cause, as a result of the plurality of identified execution traces satisfying a set of conditions, the computer system to perform one or more actions based at least in part on the one or more system policies.

6. The system of claim 5, wherein the set of conditions comprises instructions that, as a result of execution by the one or more processors of the system, further cause the system to determine whether a number of the plurality of identified execution traces exceeds a threshold value.

7. The system of claim 6, wherein the instructions that, as a result of execution by the one or more processors of the system, further cause the system to compute a statistical measure for the plurality of identified execution traces based at least in part on the determination that the number of the plurality of identified execution traces exceeds the threshold value.

8. The system of claim 7, wherein the instructions that, as a result of execution by the one or more processors of the system, further cause the system to:
    determine whether the statistical measure satisfies a second set of conditions; and
    cause the computer system to perform the one or more actions based at least in part on the determination.

9. The system of claim 8, wherein perform the one or more actions further comprises instructions that, as a result of execution by the one or more processors of the system, further cause the system to restrict the computer executable instructions based at least in part on the determination that the statistical measure satisfies the second set of conditions.

10. The system of claim 8, wherein perform the one or more actions further comprise instructions that, as a result of execution by the one or more processors of the system, further cause the system to identify additional execution traces that include information corresponding to the algorithm that is restricted by the one or more system policies based at least in part on the determination that the statistical measure does not satisfy the second set of conditions.

11. The system of claim 5, wherein an execution trace of the plurality of execution traces indicates a directed graph comprising nodes representing instructions and edges representing an order of execution of instructions.

12. The system of claim 5, wherein the plurality of execution traces including information corresponding to an algorithm that is restricted by one or more system policies are identified by sampling an application executing computer executable instructions on the computer system.

13. A non-transitory computer-readable storage medium comprising executable instructions that, as a result of execution by one or more processors of a computer system, cause the computer system to at least:
   obtain information from a plurality of execution traces;
   determine, based at least in part on the pattern whether the plurality of execution traces match a reference pattern that satisfies a set of conditions corresponding to an algorithm restricted by one or more system policies; and
   cause the computer system to perform one or more actions based at least in part on the determination.

14. The non-transitory computer-readable storage medium of claim 13, wherein the set of conditions comprises instructions that, as a result of execution by the one or more processors of the computer system, further cause the computer system to determine whether a number of the plurality of execution traces exceeds a threshold value.

15. The non-transitory computer-readable storage medium of claim 14, wherein the instructions that, as a result of execution by the one or more processors of the computer system, further cause the computer system to compute a statistical measure for the plurality of execution traces based at least in part on the determination that the number of the plurality of execution traces exceeds the threshold value.

16. The non-transitory computer-readable storage medium of claim 15, wherein the statistical measure is at least one of:
   an average;
   an arithmetic mean;
   a median;
   a time-weighted average; or
   a histogram.

17. The non-transitory computer-readable storage medium of claim 15, wherein an execution trace of the plurality of execution traces indicates a sequence of instructions recorded as having been processed by a processor.

18. The non-transitory computer-readable storage medium of claim 17, wherein perform the one or more actions further comprises instructions that, as a result of execution by the one or more processors of the computer system, further cause the computer system to restrict the computer executable instructions based at least in part on the determination that the statistical measure satisfies the second set of conditions.

19. The non-transitory computer-readable storage medium of claim 17, wherein perform the one or more instructions further comprise instructions that, as a result of execution by the one or more processors of the computer system, further cause the computer system to identify additional execution traces that include information corresponding to the algorithm that is restricted by the one or more system policies based at least in part on the determination that the statistical measure does not satisfy the second set of conditions.

20. The non-transitory computer-readable storage medium of claim 13, wherein the plurality of execution traces including information corresponding to an algorithm that is restricted by one or more system policies are identified by sampling an application executing computer executable instructions on the computer system.

* * * * *